(12) United States Patent
Hall et al.

(10) Patent No.: US 9,920,733 B2
(45) Date of Patent: *Mar. 20, 2018

(54) SYSTEM AND METHOD FOR PREVENTING UNAUTHORIZED MODIFICATION TO ENGINE CONTROL SOFTWARE OR AN ENGINE CONTROL SYSTEM

(71) Applicant: THERMO KING CORPORATION, Minneapolis, MN (US)

(72) Inventors: Cullen Evan Hall, Savage, MN (US); Gary McGinley, Lakeville, MN (US); Erich Albert Lucht, Arden Hills, MN (US); Michael James Vanous, Minneapolis, MN (US); Michael Dean Turnquist, Maple Grove, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/370,402

(22) Filed: Dec. 6, 2016

(65) Prior Publication Data

US 2017/0082079 A1 Mar. 23, 2017

Related U.S. Application Data

(63) Continuation of application No. 14/781,396, filed as application No. PCT/US2014/032539 on Apr. 1, 2014.

(Continued)

(51) Int. Cl.
*F02N 11/08* (2006.01)
*F02B 77/08* (2006.01)
(Continued)

(52) U.S. Cl.
CPC ......... *F02N 11/101* (2013.01); *B60H 1/3205* (2013.01); *B60H 1/3226* (2013.01);
(Continued)

(58) Field of Classification Search
CPC ........ F02B 77/08; F02N 11/08; F02N 11/087; F02N 11/0874; F02N 11/0877;
(Continued)

(56) References Cited

U.S. PATENT DOCUMENTS 5,365,436 A 11/1994 Schaller et al.
5,742,137 A 4/1998 Bratton et al.
(Continued)

FOREIGN PATENT DOCUMENTS

CN 1124215 6/1996
CN 1712688 12/2005
(Continued)

OTHER PUBLICATIONS

Supplementary European Search Report issued in corresponding European Application No. 14778393.0 dated Jan. 2, 2017 (8 pages).

(Continued)

*Primary Examiner* — Erick Solis
(74) *Attorney, Agent, or Firm* — Hamre, Schumann, Mueller & Larson, P.C.

(57) ABSTRACT

A system and method for preventing unauthorized modification to engine control software or an engine control system of, for example, a refrigerated transport application is provided. Particularly, the embodiments described herein prevent unauthorized parties from inadvertently or intentionally making changes to the engine control software used for controlling the engine or the engine control system that could, for example, potentially bypass emission strategies implemented in the refrigerated transport application. Accordingly, emission strategies such as, for example, EPA (Continued)

Tier IV not-to-exceed ("NTE") regulations can be maintained.

20 Claims, 3 Drawing Sheets

Related U.S. Application Data

(60) Provisional application No. 61/807,132, filed on Apr. 1, 2013.

(51) Int. Cl.
| | | |
|---|---|---|
| *F02N 11/10* | (2006.01) | |
| *F02D 17/04* | (2006.01) | |
| *F02D 35/00* | (2006.01) | |
| *B60R 25/045* | (2013.01) | |
| *F02D 41/24* | (2006.01) | |
| *B60H 1/32* | (2006.01) | |
| *F02D 29/00* | (2006.01) | |
| *B60R 25/04* | (2013.01) | |

(52) U.S. Cl.
CPC ............ *B60R 25/045* (2013.01); *F02D 17/04* (2013.01); *F02D 35/00* (2013.01); *F02D 41/2487* (2013.01); *F02N 11/0803* (2013.01); *F02N 11/087* (2013.01); *B60R 2025/041* (2013.01); *F02D 29/00* (2013.01)

(58) Field of Classification Search
CPC ........ F02N 11/10; F02N 11/101; F02D 17/04; F02D 41/249; F02D 41/2448; G01R 31/007
USPC .................. 701/113, 114; 123/179.3, 198 D; 73/114.61
See application file for complete search history.

(56) References Cited

U.S. PATENT DOCUMENTS

| | | | |
|---|---|---|---|
| 5,787,367 A | 7/1998 | Berra | |
| 6,487,717 B1 | 11/2002 | Brunemann et al. | |
| 6,571,191 B1 | 5/2003 | York et al. | |
| 7,091,629 B2 | 8/2006 | Kawkins | |
| 7,100,557 B2 | 9/2006 | Takezoe | |
| 7,552,705 B2 | 6/2009 | Serkh et al. | |
| 7,822,535 B2 | 10/2010 | Yaguchi | |
| 8,966,289 B2 | 2/2015 | Prochaska et al. | |
| 9,038,132 B2 | 5/2015 | Harata et al. | |
| 2004/0262995 A1 | 12/2004 | Hawkins | |
| 2005/0108488 A1 | 5/2005 | Rohm et al. | |
| 2005/0197744 A1* | 9/2005 | Kalau | B60R 25/04 701/1 |
| 2006/0138863 A1 | 6/2006 | Jones et al. | |
| 2006/0150255 A1 | 7/2006 | Ceskutti | |
| 2010/0299023 A1 | 11/2010 | Okada | |
| 2011/0047630 A1 | 2/2011 | Cheng et al. | |
| 2012/0103291 A1 | 5/2012 | Ota et al. | |
| 2012/0155645 A1 | 6/2012 | Prochaska et al. | |
| 2012/0245788 A1 | 9/2012 | Pauli | |
| 2013/0090784 A1 | 4/2013 | Hibbert | |
| 2013/0104231 A1 | 4/2013 | Niner et al. | |
| 2013/0219170 A1 | 8/2013 | Naitou et al. | |
| 2014/0343787 A1 | 11/2014 | Mabuchi | |

FOREIGN PATENT DOCUMENTS

| | | |
|---|---|---|
| CN | 101432175 | 5/2009 |
| CN | 101626931 | 1/2010 |
| DE | 19532484 | 8/1996 |
| DE | 102011110142 | 2/2013 |
| EP | 2722236 | 4/2014 |
| FR | 2767766 | 3/1999 |
| JP | 2001347925 | 12/2011 |
| WO | 2012172644 | 2/2015 |

OTHER PUBLICATIONS

Chinese Office Action issued in corresponding Chinese Application No. 201480029759.0 dated Oct. 26, 2016 (5 pages).

International Search Report and Written opinion for International Application No. PCT/US2014/032539, dated Jul. 28, 2014 (10 pages).

European Office Action issued in European Application No. 14778393.0 dated Dec. 12, 2017 (6 pages).

* cited by examiner

SYSTEM AND METHOD FOR PREVENTING UNAUTHORIZED MODIFICATION TO ENGINE CONTROL SOFTWARE OR AN ENGINE CONTROL SYSTEM

FIELD

The embodiments disclosed herein relate to engine control systems. More specifically, the embodiments described herein relate to a system and method for preventing unauthorized modification to engine control software or an engine control system of, for example, a refrigerated transport application.

BACKGROUND

Existing refrigerated transport applications, such as a transport refrigeration system ("TRS"), an auxiliary power unit ("APU"), etc., can include an engine for providing power thereto. The engine can be controlled by a controller of the refrigerated transport application to meet Environment Protection Agency ("EPA") regulations.

SUMMARY

The embodiments disclosed herein relate to a system and method for preventing unauthorized modification to engine control software or an engine control system of, for example, a refrigerated transport application.

Particularly, the embodiments described herein prevent unauthorized parties from inadvertently or intentionally making changes to the engine control software used for controlling the engine or the engine control system that could, for example, potentially bypass emission strategies implemented in the refrigerated transport application. Accordingly, emission strategies such as, for example, EPA Tier IV not-to-exceed ("NTE") regulations can be maintained by the refrigerated transport application.

In one embodiment, an engine control system is provided. The engine control system includes a power unit that includes an engine, and a controller. The controller is configured to activate the engine via an engine activation signal and control the engine using an engine control software. The controller includes a relay connected to the power unit. The controller is configured to detect an unauthorized modification event. The relay is configured to prevent the engine activation signal from passing to the power unit when the controller detects an unauthorized modification event.

In another embodiment, a method for an engine control system is provided. The engine control system includes a power unit having an engine, and a controller configured to activate the engine via an engine activation signal and control the engine using an engine control software. The controller includes a relay connected to the power unit. The method includes activating the relay to an ON state when the relay receives an engine implementation signal. The method also includes the relay sending an engine activation signal to the power unit for starting the engine when the relay is in the ON state and upon receipt of the engine activation signal.

The embodiments described herein are not limited to transport refrigeration applications. Rather, these embodiments can be provided to prevent unauthorized modification to engine control software or an engine control system for any application that uses an engine.

These embodiments can prevent an unauthorized party from implementing unauthorized modifications to an engine control software or an engine control system so as to operate the engine beyond user defined parameters and/or beyond the capability of the engine.

Further, the embodiments described herein provide physical evidence of an unauthorized modification to engine control software or an engine control system. Accordingly, a service technician or the like can determine whether liability and/or warranty claims brought by a customer are valid claims.

Other aspects of the invention will become apparent by consideration of the detailed description and accompanying drawings.

BRIEF DESCRIPTION OF THE DRAWINGS

Referring now to the drawings in which like reference numbers represent corresponding parts throughout.

DETAILED DESCRIPTION

The embodiments disclosed herein relate to a system and method for preventing unauthorized modification to engine control software or an engine control system of, for example, a refrigerated transport application.

Particularly, the embodiments described herein prevent unauthorized parties from inadvertently or intentionally making changes to the engine control software used for controlling the engine or the engine control system that could, for example, potentially bypass emission strategies implemented in the refrigerated transport application. Accordingly, emission strategies such as, for example, EPA Tier IV not-to-exceed ("NTE") regulations for a refrigerated transport application can be maintained by the refrigerated transport application.

While the embodiments provided herein are directed to a transport refrigeration unit ("TRU") for a truck, it will be appreciated that the embodiments described herein may be used in any suitable refrigerated transport application such as a refrigerated transport system (trailers (e.g., trailer on flat cars, etc.), containers (e.g., containers on flat cars, intermodal containers, etc.), trucks, box cars a ship board container, an air cargo cabin, an over the road truck cabin, etc.), an APU, etc.

Also, the embodiments described herein are not limited to transport refrigeration applications. Rather, these embodiments can be provided to prevent unauthorized modification to engine control software or an engine control system for any application that uses an engine.

These embodiments can prevent an unauthorized party from implementing unauthorized modifications to an engine control software or an engine control system so as to operate the engine beyond user defined parameters and/or beyond the capability of the engine.

Further, the embodiments described herein provide physical evidence of an unauthorized modification to engine control software or an engine control system. Accordingly, a service technician or the like can determine whether liability and/or warranty claims brought by a customer are valid claims.

Other aspects of the disclosure will become apparent by consideration of the detailed description and accompanying drawings.

Figure 1:
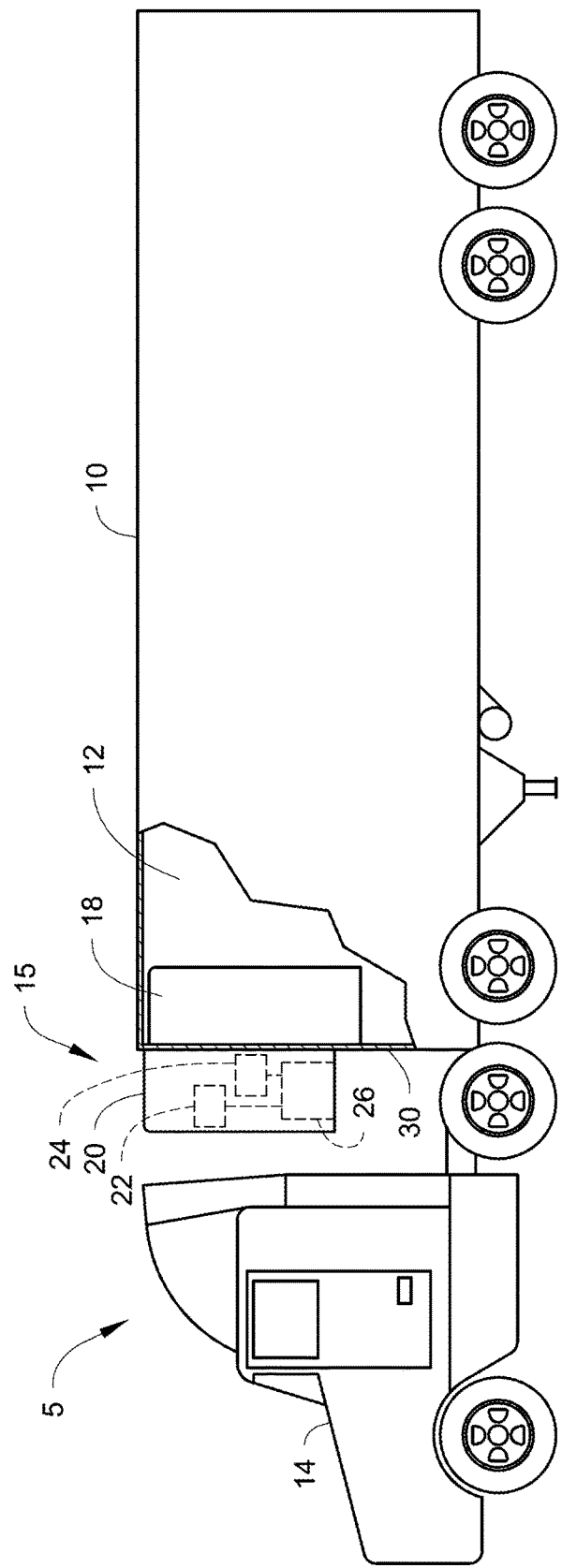
FIG. 1 is a side view of a truck with a transport refrigeration unit, according to one embodiment.

Referring to FIG. 1, a truck 5 with a TRU 15 is illustrated. The truck 5 includes a cab 14 and a trailer 10 containing a load or cargo space 12. The TRU 15 is provided at one end of the trailer 10.

The TRU 15 includes an evaporator section 18 located in the cargo space 12 and a condenser section 20 mounted on a front wall 30 of the trailer 10. The TRU 15 also includes a TRU controller 22, an engine-driven compressor 24 and a TRU engine 26. The TRU controller 22 is configured to control operation of the TRU 15, including engine control of the TRU engine 26 so as to meet EPA emissions regulations.

While the TRU engine 26 in FIG. 1 is shown to be located inside the TRU 15, in other embodiments, the TRU engine 26 can be provided external the TRU 15, for example in a separate generator set attached to the trailer 10 or in the cab 14.

The TRU engine 26 can be a mechanical diesel engine. In some embodiments, the TRU engine 26 is large engine (e.g., greater than ~25 horsepower engine). In other embodiments, the TRU engine 26 is a small engine (e.g., less than or equal to ~25 horsepower engine).

The TRU 15 draws relatively warm air from within the cargo space 12, cools the air, and returns the cold air to the cargo space 12. Cold air exiting the TRU 15 can be generally directed a ceiling 40 of the trailer 10. The TRU 15 is configured to distribute cold air substantially evenly throughout the cargo space 12 to ensure that the entire cargo space 12 can be evenly cooled.

Figure 2:
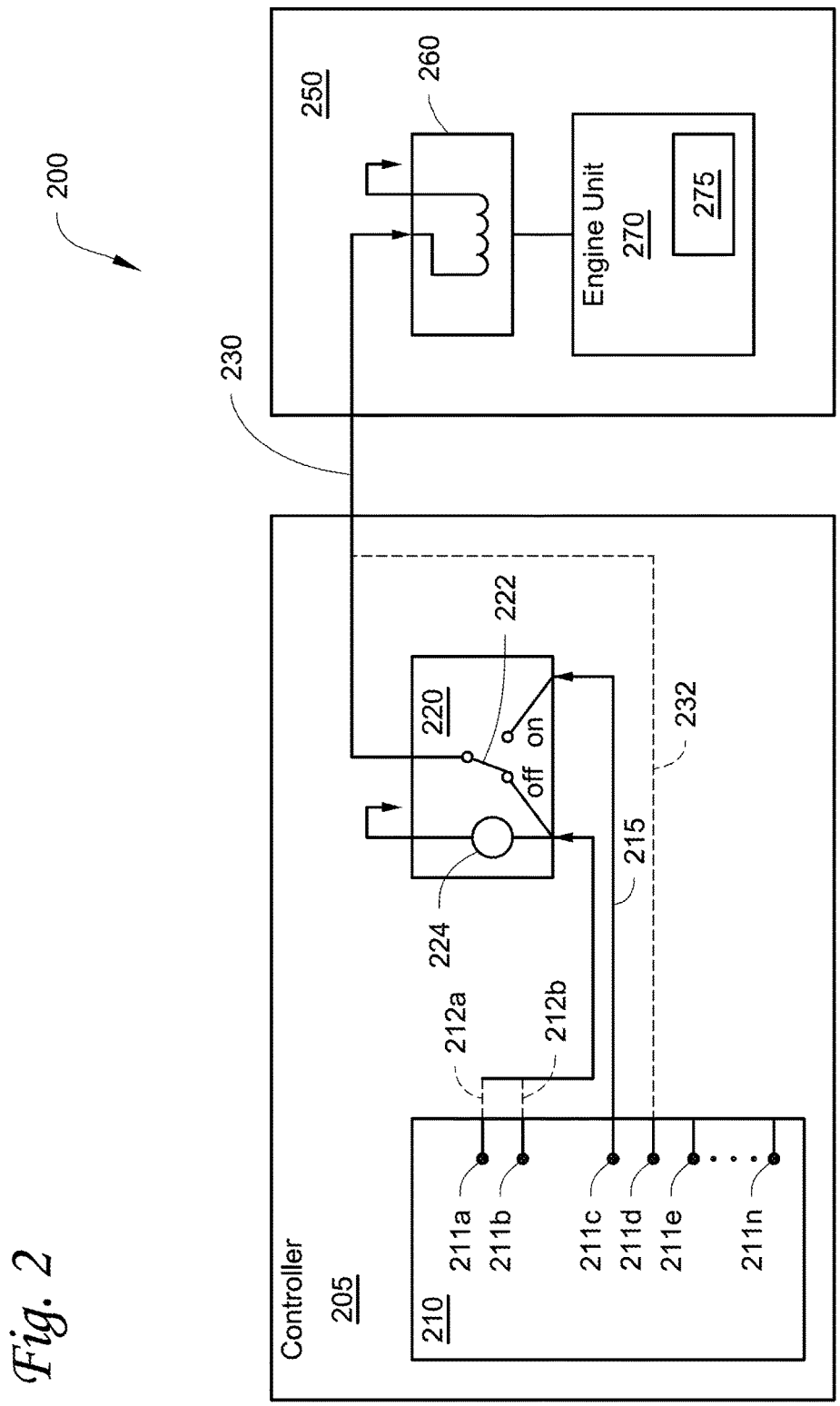
FIG. 2 is a block diagram schematic of an engine control system, according to one embodiment.

FIG. 2 illustrates a block diagram schematic of an engine control system 200 that can be used, for example, in a refrigerated transport application such as the TRU 15 shown in FIG. 1. The engine control system 200 includes a controller 205 and a power unit 250. The controller 205 can be, for example, a TRU controller such as the TRU controller 22 shown in FIG. 1. The controller 205 is configured to control operation of the refrigerated transport application including engine control of the power unit 250. While the engine control system 200 is described for use with a transport refrigeration application, it is appreciated that the embodiments described herein can be used in any application that uses an engine.

The controller 205 includes a circuit board 210 and a relay 220. The circuit board 210 can include a processor (not shown), a memory (not shown), a clock (not shown), and an input/output (I/O) interface (not shown) for controlling operation of the refrigerated transport application, including engine control of the power unit 250 so as to meet EPA emissions regulations. Various control algorithms, including engine control algorithms for controlling engine operation of the power unit 250, can be stored in the memory of the circuit board 210 and implemented via the processor of the circuit board 210.

The circuit board 210 includes a plurality of pins 211a-n for connecting various components of the refrigerated transport application to the controller 205. In this embodiment, the pins 211a and 211b are provided for connecting the controller 205 to the relay 220 via optional connections 212a and 212b. The pin 211a is configured to send a large engine implementation signal. The pin 211b is configured to send a small engine implementation signal. The pin 211c is configured to send an engine activation signal to the relay 220 via a connection 215. The pin 211d is configured to receive any signal outputted from the relay 220 when an optional feedback connection 232 is connected to the pin 211d and the relay 220. Each of the pins 211e-211n can be used for other implementation aspects of the controller 205, or may not be used at all.

In some embodiments, the circuit board 210 can implement a large engine control algorithm and/or a small engine control algorithm. The large engine control algorithm can control operation of the power unit 250 to meet emission regulations when an engine 275 of an engine unit 270 of the power unit 250 has a horsepower greater than ~25 HP. The small engine control algorithm can control operation of the power unit 250 to meet emission regulations when the engine 275 has a horsepower less than or equal to ~25 HP.

In this embodiment, the circuit board 210 is configured to implement the large engine control algorithm by sending the large engine implementation signal via the pin 211a and is configured to implement the small engine control algorithm by sending the small engine implementation signal via the pin 211b.

During installation, connections 212a and 212b can be connected between pins 211a and 212b to the relay 220. When a large engine (e.g., greater than ~25 horsepower engine) is installed as the engine 275, the installer can remove the connection 212a so as to prevent the small engine control algorithm implemented via pin 211b from controlling operation of the engine 275. When a small engine (e.g., less than or equal to ~25 horsepower engine) is installed as the engine 275, the installer can remove the connection 212a so as to prevent the large engine control algorithm implemented via pin 211b from controlling operation of the engine 275.

The relay 220 is provided for preventing unauthorized modification to engine control software or the engine control system 200. In this embodiment, the relay 220 includes a switch 222 and a solenoid 224.

The relay 220 is configured to receive either a small engine implementation signal from the pin 211a via the connection 212a or a large engine implementation signal from the pin 211b via the connection 212b. The relay 220 is also configured to receive an engine activation signal from the pin 211c via the connection 215.

The switch 222 is configured to be in an on state when the solenoid 224 receives either the small or large engine implementation signal and is configured to be in an off state when the solenoid 224 does not receive either the small or large engine implementation signal. When the switch 222 is in the on state and the relay 220 receives the engine activation signal from the pin 211c, the relay 220 is configured to relay, via the connection 230, the engine activation signal to a stop solenoid 260 of the power unit 250. When the optional feedback connection 232 is connected between the relay 220 and the pin 211d of the circuit board 210, the relay 220 can provide feedback to the circuit board 210 as to whether engine activation signal is sent to the power unit 250.

While in this embodiment the relay 220 is provided in the controller 205, in other embodiments, the relay 220 can be provided in the power unit 250 or external to the controller 205 and the power unit 250.

The power unit 250 includes the stop solenoid 260 and the engine unit 270. The stop solenoid 260 is configured to energize the engine unit 270 when an engine activation signal is received from the relay 220. In particular, the stop solenoid 260 can be configured to cut fuel supply to the engine 275 when an engine activation signal is not received.

The engine unit 270 includes the engine 275. In some embodiments, the engine 275 is a mechanical diesel engine used to provide power for the refrigerated transport application. Depending on user requirements, the engine 275 can be a large engine (e.g., greater than ~25 horsepower engine) or a small engine (e.g., less than or equal to ~25 horsepower engine).

In operation, a user is not aware of the operation of the pins 211a and 211b on the circuit board 210 or the relay 220. During installation, the installer will choose whether to connect the connection 212a between the pin 212a and the relay 220 or the connection 212b between the pin 212b and the relay 220 depending on whether the engine 275 being installed is a large engine or a small engine.

In a conventional engine control system for a refrigerated transport application, the engine control system does not include a relay between a circuit board of a controller and a stop solenoid of a power unit and an engine activation signal is sent directly from the circuit board to the stop solenoid. Also, a conventional engine control algorithm stored in a memory of the circuit board 210 are not designed to provide small and/or large engine implementation signals to the pins 211a and 211b.

Accordingly, any intentional or inadvertent attempts to install a modified or conventional engine control algorithm to the engine control system 200 or attempts to modify the configuration of the engine control system 200 will prevent the controller 205 from sending an engine activation signal to the stop solenoid 260, and thereby prevent the engine 275 from starting. This can prevent inadvertent or intentional attempts to bypass emission strategies implemented in the engine control algorithms of the refrigerated transport application. Accordingly, emission strategies such as, for example, EPA Tier IV not-to-exceed ("NTE") regulations can be maintained by the refrigerated transport application.

In some embodiments, when the feedback connection 232 is provided between the relay 220 and the pin 211d, a processor of the controller, such as the processor in the circuit board 210, can determine that an error has occurred when the connection 215 is sending an engine activation signal and the feedback connection 232 is not relaying the same engine activation signal back to the pin 211d. The controller 205 can then be configured to notify the user of an error in the engine control system 200.

Figure 3:
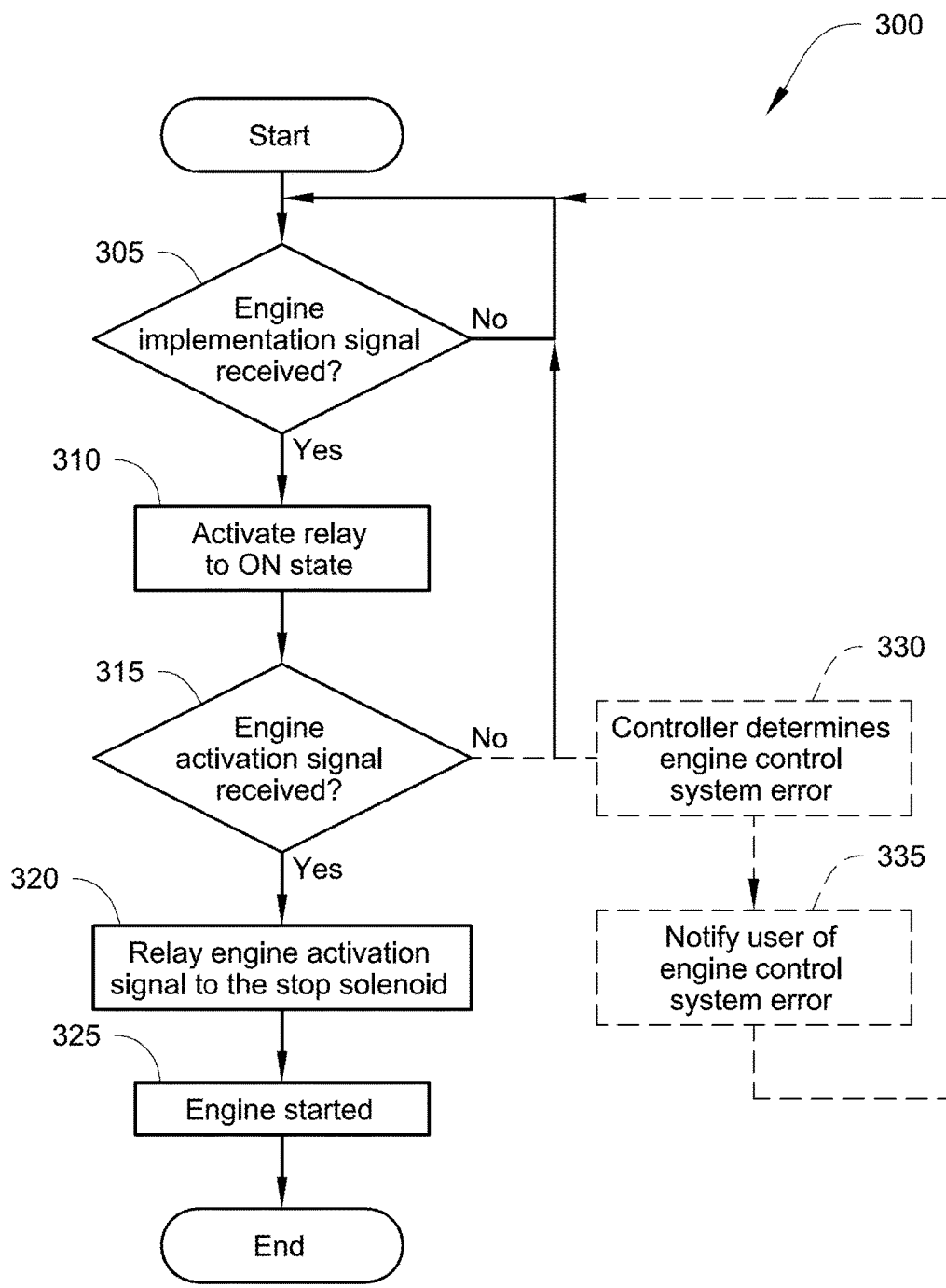
FIG. 3 illustrates a flowchart of one embodiment of a process for starting the engine of the engine control system shown in FIG. 2

FIG. 3 illustrates a flowchart of one embodiment of a process 300 for starting the engine 275 of the engine control system 200 shown in FIG. 2. The process begins at 305, where the relay 220 determines whether an engine implementation signal is received from either the pin 211a or the pin 211b of the circuit board 210. If the engine implementation signal is received, the solenoid 224 is configured to activate, thereby setting the switch 222 into the on state at 310.

At 315, the relay 220 waits for an engine activation signal from pin 211c of the circuit board 210. If the engine activation signal is received, the relay 220 is configured to relay the engine activation signal to the stop solenoid 260 at 320. When the engine activation signal is received by the stop solenoid 260, the stop solenoid 260 is activated, thereby starting the engine 275 at 325.

In some embodiments, when the feedback connection 232 is provided between the pin 211d and the relay 220, any signal outputted from the relay 220 is sent back to the pin 211d of the circuit board 210. A processor of the controller 205, such as the processor in the circuit board 210, can be configured to determine that an engine control system error has occurred at 330 when an engine activation signal is sent from the pin 211c to the relay 220, but the engine activation signal is not received by the pin 211d. At 335, the controller 205 can then notify the user of an error to the engine control system.

Through the process 300, any intentional or inadvertent attempts to install a modified or conventional engine control algorithm to the engine control system 200 or attempts to modify the configuration of the engine control system 200 will prevent the controller 205 from sending an engine activation signal to the stop solenoid 260, and thereby prevent the engine 275 from starting. This provides physical evidence that an unauthorized (inadvertent or intentional) modification to engine control software or the engine control system 200 has occurred.

Accordingly, these embodiments can prevent inadvertent or intentional attempts to, for example, bypass emission strategies implemented in the engine control algorithms of the engine control system 200. Accordingly, emission strategies such as, for example, EPA Tier IV not-to-exceed ("NTE") regulations can be maintained by the engine control system 200 when used in, for example, a refrigerated transport application.

Aspects:

It is noted that any of the features of aspects 1-9 can be combined with any of the features of aspects 10-15.

1. An engine control system comprising:
  a power unit that includes an engine; and
  a controller configured to activate the engine via an engine activation signal and control the engine using an engine control software, the controller including a relay connected to the power unit,
  wherein the controller is configured to detect an unauthorized modification event, and
  wherein the relay is configured to prevent the engine activation signal from passing to the power unit when the controller detects an unauthorized modification event.

2. The engine control system of aspect 1, wherein the unauthorized modification event is an unauthorized modification to the engine control software.

3. The engine control system of any of aspects 1-2, wherein the unauthorized modification event is an unauthorized modification to the engine control system.

4. The engine control system of any of aspects 1-3, wherein the power unit includes a stop solenoid, the relay is connected to the stop solenoid, and the relay is configured to send the engine activation signal to the stop solenoid when the controller does not detect an unauthorized modification event.

5. The engine control system of any of aspects 1-4, wherein the controller includes a circuit board connected to the relay, the circuit board being configured to send an engine implementation signal to the relay when the controller does not detect an unauthorized modification event.

6. The engine control system of aspect 5, wherein the relay includes a switch having an ON state and an OFF state, and a solenoid configured to receive the engine implementation signal from the circuit board and configured to change the switch to the ON state upon receipt of the engine implementation signal.

7. The engine control system of aspect 6, wherein the relay is configured to send the engine activation signal to the power unit when the switch is in the ON state and is configured to prevent the engine activation signal from passing to the power unit when the switch is in the OFF state.

8. The engine control system of any of aspects 6-7, wherein the controller includes a first connection configured to pass the engine implementation signal from the circuit board to the solenoid, and a second connection configured to pass the engine activation signal from the circuit board to the switch.

9. The engine control system of any of aspects 5-8, wherein the controller includes a feedback connection configured to send the engine activation signal from the relay to the circuit board when the relay passes the engine activation signal to the power unit.

10. A method for an engine control system that includes a power unit having an engine, and a controller configured to activate the engine via an engine activation signal and control the engine using an engine control software, the controller including a relay connected to the power unit, the method comprising:
activating the relay to an ON state when the relay receives an engine implementation signal; and
the relay sending an engine activation signal to the power unit for starting the engine when the relay is in the ON state and upon receipt of the engine activation signal.

11. The method of aspect 10, further comprising:
changing the relay to an OFF state when the relay does not receive an engine implementation signal; and
the relay preventing the engine activation signal from passing to the power unit when the relay is in the OFF state.

12. The method of any of aspects 10-11, further comprising:
sending the engine activation signal from the relay to a circuit board of the controller via a feedback connection when the relay is in the ON state and the relay is sending the engine activation signal to the power unit.

13. The method of aspect 12, further comprising:
the controller determining an engine control system error when the circuit board sends the engine implementation signal and the engine activation signal to the relay, and the circuit board does not receive the engine activation signal from the relay via a feedback connection.

14. The method of aspect 13, further comprising:
notifying a user of the engine control system error when the controller determines the engine control system error.

15. The method of any of aspects 10-14, further comprising:
a circuit board of the controller sending the engine implementation signal to a solenoid of the relay to activate a switch of the relay to the ON state;
the circuit board of the controller sending the engine activation signal to the switch; and
the switch sending the engine activation signal to the power unit for starting the engine when the switch is in the ON state and upon receipt of the engine activation signal.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

The invention claimed is:

1. An engine control system comprising:
a power unit that includes an engine; and
a controller configured to activate the engine via an engine activation signal and control the engine using an engine control software, the controller including a relay connected to the power unit,
wherein the controller is configured to detect an unauthorized modification event,
wherein the controller is configured to send the engine activation signal to the relay,
wherein the controller is configured to send an engine implementation signal to the relay when the controller does not detect the unauthorized modification event,
wherein the relay is configured to prevent the engine activation signal from passing to the power unit when the controller detects the unauthorized modification event, and
wherein the power unit includes an engine activation device, the relay is connected to the engine activation device, and the relay is configured to send the engine activation signal to the engine activation device when the relay receives the engine implementation signal.

2. The engine control system of claim 1, wherein the unauthorized modification event is an unauthorized modification to the engine control software.

3. The engine control system of claim 1, wherein the unauthorized modification event is an unauthorized modification to the engine control system.

4. The engine control system of claim 1, wherein the engine activation device is a stop solenoid.

5. The engine control system of claim 1, wherein the controller includes a circuit board connected to the relay, the circuit board being configured to send the engine implementation signal to the relay when the controller does not detect the unauthorized modification event.

6. The engine control system of claim 5, wherein the relay includes a switch having an ON state and an OFF state, and a solenoid configured to receive the engine implementation signal from the circuit board and configured to change the switch to the ON state upon receipt of the engine implementation signal.

7. The engine control system of claim 6, wherein the relay is configured to send the engine activation signal to the power unit when the switch is in the ON state and is configured to prevent the engine activation signal from passing to the power unit when the switch is in the OFF state.

8. The engine control system of claim 6, wherein the controller includes a first connection configured to pass the engine implementation signal from the circuit board to the solenoid, and a second connection configured to pass the engine activation signal from the circuit board to the switch.

9. An engine control system comprising:
a power unit that includes an engine; and
a controller configured to activate the engine via an engine activation signal and control the engine using an engine control software, the controller including a relay connected to the power unit,
wherein the controller is configured to detect an unauthorized modification event,
wherein the relay is configured to prevent the engine activation signal from passing to the power unit when the controller detects the unauthorized modification event,
wherein the power unit includes an engine activation device, the relay is connected to the engine activation device, and the relay is configured to send the engine activation signal to the engine activation device when the controller does not detect the unauthorized modification event,
wherein the controller includes a circuit board connected to the relay, the circuit board being configured to send an engine implementation signal to the relay when the controller does not detect the unauthorized modification event, and
wherein the controller includes a feedback connection configured to send the engine activation signal from the relay to the circuit board when the relay passes the engine activation signal to the power unit.

10. A method for an engine control system that includes a power unit having an engine, and a controller configured to activate the engine via an engine activation signal and control the engine using an engine control software, the controller including a relay connected to the power unit, the method comprising:

activating the relay to an ON state when the relay receives an engine implementation signal from the controller; and the relay sending an engine activation signal to the power unit for starting the engine when the relay is in the ON state and upon receipt of the engine activation signal from the controller.

11. The method of claim 10, further comprising:

changing the relay to an OFF state when the relay does not receive an engine implementation signal; and the relay preventing the engine activation signal from passing to the power unit when the relay is in the OFF state.

12. The method of claim 10, further comprising:

sending the engine activation signal from the relay to a circuit board of the controller via a feedback connection when the relay is in the ON state and the relay is sending the engine activation signal to the power unit.

13. The method of claim 12, further comprising:

the controller determining an engine control system error when the circuit board sends the engine implementation signal and the engine activation signal to the relay, and the circuit board does not receive the engine activation signal from the relay via a feedback connection.

14. The method of claim 13, further comprising:

notifying a user of the engine control system error when the controller determines the engine control system error.

15. The method of claim 10, further comprising:

a circuit board of the controller sending the engine implementation signal to an engine activation device of the relay to activate a switch of the relay to the ON state;

the circuit board of the controller sending the engine activation signal to the switch; and the switch sending the engine activation signal to the power unit for starting the engine when the switch is in the ON state and upon receipt of the engine activation signal.

16. The method of claim 10, further comprising the relay sending the engine activation signal to an engine activation device of the power unit when the controller does not detect an unauthorized modification event.

17. The method of claim 16, wherein the engine activation device is a solenoid.

18. The method of claim 16, wherein the unauthorized modification event bypasses an emissions strategy.

19. The engine control system of claim 1, wherein the unauthorized modification event bypasses an emissions strategy.

20. The engine control system of claim 1, wherein the engine implementation signal is at least one of a large engine implementation signal and a small engine implementation signal, wherein the large engine implementation signal is configured to implement a large engine control algorithm when the engine is a greater than 25 horsepower engine, and wherein the small engine implementation signal is configured to implement a small engine control algorithm when the engine is a less than or equal to 25 horsepower engine.

* * * * *